United States Patent
Strope

[19]

[11] Patent Number: 5,851,269
[45] Date of Patent: Dec. 22, 1998

[54] AIR DESICCANT CANISTER FOR AN AIR BRAKE SYSTEM

[75] Inventor: Claude Strope, Kearney, Nebr.

[73] Assignee: Baldwin Filters, Inc., Kearney, Nebr.

[21] Appl. No.: 850,633

[22] Filed: May 2, 1997

[51] Int. Cl.[6] ................................................. B01D 53/02
[52] U.S. Cl. ................................ 96/144; 96/147; 96/151; 96/152
[58] Field of Search ......................... 96/144, 138, 135, 96/141, 147, 151, 152; 95/117, 122; 55/DIG. 17

[56] References Cited

U.S. PATENT DOCUMENTS

| | | | |
|---|---|---|---|
| 4,336,042 | 6/1982 | Frantz et al. | 55/DIG. 17 |
| 4,398,929 | 8/1983 | Segersten | 55/DIG. 17 |
| 4,487,617 | 12/1984 | Dienes et al. | 55/DIG. 17 |
| 4,659,467 | 4/1987 | Spearman . | |
| 4,673,419 | 6/1987 | Kojima | 55/DIG. 17 |
| 4,713,094 | 12/1987 | Yawagawa et al. | 55/DIG. 17 |
| 4,733,449 | 3/1988 | Spearman . | |
| 4,925,466 | 5/1990 | Overby | 55/DIG. 17 |
| 4,946,485 | 8/1990 | Larsson | 96/152 |
| 5,538,542 | 7/1996 | Watanabe et al. | 96/152 |
| 5,580,451 | 12/1996 | Tack . | |
| 5,591,243 | 1/1997 | Colussi et al. | 55/DIG. 17 |
| 5,595,588 | 1/1997 | Blevins | 55/DIG. 17 |
| 5,607,500 | 3/1997 | Shamine et al. | 55/DIG. 17 |
| 5,622,544 | 4/1997 | Shamine et al. | 55/DIG. 17 |
| 5,718,743 | 2/1998 | Donnelly et al. | 96/152 |

FOREIGN PATENT DOCUMENTS

002560063A   8/1985   France .............................. 55/DIG. 17

*Primary Examiner*—Jay H. Woo
*Assistant Examiner*—Minh-Chau T. Pham
*Attorney, Agent, or Firm*—Leydig, Voit & Mayer, Ltd.

[57] ABSTRACT

A desiccant canister for an air braking system having dual internal air flow paths and means for avoiding localized compression of the molecular desiccant sieve. The present invention provides a spin-on canister having an inner shell spring-loaded into an outer shell. The inner shell contains the molecular desiccant sieve. To increase the internal flowpath without increasing the outer size of the canister, a baffle plate is provided within the inner shell to divide the molecular sieve into an outer annular chamber and inner core of roughly equivalent flow dimension. The air to be dried therefore is able to make one pass through one flow path and then another pass through another flow path. To avoid localized compression of the molecular sieve, the inner shell is spring loaded into the outer shell and cooperates with a sliding baffle plate to effect equilibrium. In the preferred embodiment, an elastomeric pad is provided within the inner shell to further distribute the force of the spring evenly throughout the molecular sieve.

19 Claims, 5 Drawing Sheets

AIR DESICCANT CANISTER FOR AN AIR BRAKE SYSTEM

FIELD OF THE INVENTION

The present invention generally relates to air brakes, and more particularly relates to the air supply system for vehicle air brakes.

BACKGROUND OF THE INVENTION

The transportation of cargo is commonly performed by tractor-trailer trucks. Given the heavy loads such trucks typically haul, mechanical braking systems are not able to stop the trucks within an acceptable distance, and air and hydraulic brakes have therefore widely supplanted such mechanical braking systems.

While a hydraulic braking system is able to provide pressurized hydraulic fluid along hydraulic fluid lines from a central source to the multiple wheels of the vehicle, and therefore stop the vehicle more quickly than mechanical systems, they are particularly susceptible to contamination. More specifically, when one trailer is disengaged from a given tractor, and replaced with another trailer, the hydraulic fluid lines must be uncoupled, resulting in an opportunity for dirt, water, or other contaminants to enter the system. Such contamination will necessarily result in decreased brake performance due to rust, abrasion, or the like. Moreover, if a hydraulic line or coupling should become damaged, the hydraulic fluid will escape and require a costly clean-up and cause an environmentally unfavorable situation.

Air brakes have therefore become the system of choice for cargo transporting trucks. With such an air system, a central source of compressed air is provided which communicates pressurized air along conduits to the individual brake components. Unlike the cost and environmental drawbacks associated with hydraulic systems, if an air line or coupling fails, no costly clean-up is required. However, air braking systems still require means for preventing contaminants from entering the system. The contaminant of most concern is humidity. If water is allowed to enter the system, the brakes will rust and can ultimately fail.

Prior art systems therefore provide a desiccant to remove moisture from the pressurized air. Most often, a molecular sieve is provided comprised of a compound able to adsorb the moisture as the air passes through the desiccant. Periodically, a portion of the dried air is purged back through the molecular sieve to remove moisture therefrom. Over time the molecular sieve breaks down and/or becomes contaminated with oil bypassed by the compressor, requiring that the pouch containing the desiccant be removed and replaced. Such a system is not only time-consuming and messy, but also requires that the operator of the vehicle remember to change the desiccant pouch at appropriate times.

More recently, the desiccant has been provided in a replaceable, spin-on canister similar to those used for conventional oil or fuel filters. As stated above, a purge cycle is periodically employed to remove the adsorbed water from the desiccant and therefore recondition the desiccant for further cycles. One example of a spin-on desiccant filter is provided in U.S. Pat. No. 4,733,449 which discloses an elongated canister having an annular outer chamber and a cylindrical core. An adsorbent material fills the outer chamber so that inlet air (e.g., from a compressor) enters the outer chamber, passes through the adsorbent material, and then passes to the outlet via the inner core.

While spin-on canisters are more readily replaceable and have been well received by the industry, the amount of moisture they can remove is dependent on the length of the flowpath through the desiccant. Since the "footprint" or space available for the canister is finite, the size of the canister cannot be increased to alleviate this problem. Moreover, it has been found that after prolonged usage, the molecular sieve beads will tend to compress in certain areas within the canister and therefore be sparsely distributed in other areas due to the cycling and purging of the pressurized air. The less compressed areas will therefore be able to move as a result of the cycling air and cause abrasion and eventually the creation of fine powder or dust. The powder or dust then serves as a contaminant which can wear against the brake elements themselves and possibly cause the brakes to fail.

SUMMARY OF THE INVENTION

It is therefore a primary aim of the present invention to provide a superior desiccant canister having a conventional outer size, but a greater internal air flow path.

It is another primary aim of the present invention to provide a desiccant canister which is able to limit localized compression of the molecular sieve beads to therefore avoid abrasion and creation of contaminating powder or dust.

It is an objective of the present invention to provide a desiccant canister for reliably providing two pass flow through the desiccant, and also having bi-directional air flowpaths to allow for one cycle to remove moisture from the air, and for another cycle to purge adsorbed moisture from the desiccant.

It is another objective of the present invention to provide a cost efficient method for manufacturing a desiccant canister having means for capturing a molecular sieve within the canister while still enabling air to pass therethrough.

In accordance with these aims and objectives, it is a feature of the present invention to provide a canister having an open end, a closed end and a cylindrical side wall with a molecular sieve disposed therein and a baffle plate attached to the open end and dividing the molecular sieve into coaxial and oppositely directed flowpaths of roughly equal dimension. The baffle plate includes a disk and an integral tube such that an annular outer chamber and an inner cylindrical chamber are created within the canister. In one embodiment, the air to be dried enters through the center cylindrical chamber and passes around the integral tube to the annular outer chamber before exiting the canister. The air flowpath is therefore effectively doubled within a outer canister of conventional size.

It is another feature of the present invention to provide the molecular sieve within an inner shell spring loaded within an outer shell. The inner shell includes a closed end, an open end closed by the baffle plate, a cylindrical side wall, and the molecular sieve. An elastomeric pad is provided proximate the inner shell closed end to evenly distribute the compression from the spring between the inner and outer shells throughout the molecular sieve. Any compressed areas press against the elastomeric pad causing the pad to deflect this force so as to move the baffle plate relative to the inner shell. This movement allows the molecular sieve to reach an equilibrium wherein the compression is uniform throughout and the aforementioned localized compression and abrasive powder creation are avoided.

It is still another feature of the present invention to provide a desiccant canister manufactured according to a method which provides for inner and outer shells, and a synthetic fabric which is molded directly into the inner shell to therefore capture the molecular sieve into the inner shell, while still enabling air to pass therethrough.

It is a still further feature of the present invention to provide a desiccant canister having first and second bi-directional flowpaths. The inlet for air to be dried can therefore serve as the outlet for the purge air, and accordingly the outlet for the dried air can serve as the inlet for the purging air.

These and other aims, objectives and features of the present invention will become more apparent from the following detailed description when taken in conjunction with the accompanying drawings.

While the present invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the present invention as defined by the appended claims.

DETAILED DESCRIPTION OF THE PREFERRED EMBODIMENT

Figure 1:
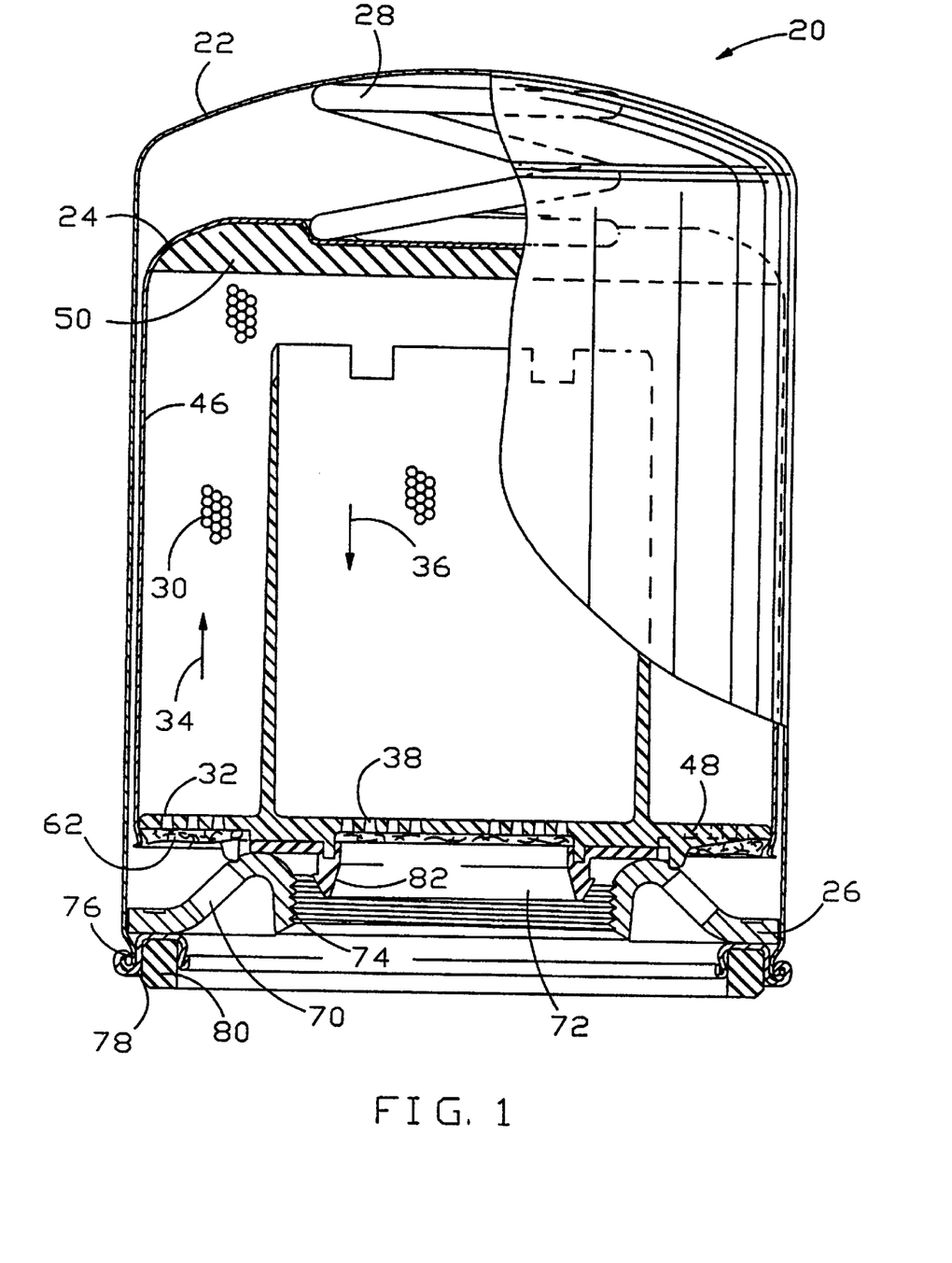
FIG. 1 is a partial sectional view of a filter exemplifying the present invention showing the air flow paths during a drying cycle.

Referring now to FIG. 1, there is shown a desiccant filter illustrating the principles of the present invention. The filter takes the form of a canister 20 which is shown with outer shell 22 partially cut away to reveal the invention in cross-section. As can be seen, in addition to outer shell 22, canister 20 includes inner shell 24 received within outer shell 22, baseplate 26 to capture inner shell 24 within outer shell 22, and spring 28 to bias inner shell 24 toward baseplate 26. Desiccant material 30 is contained within inner shell 24.

The specific details of each of the aforementioned elements will be discussed with further emphasis herein, but from FIG. 1 it will be clear to one of ordinary skill in the art that the present invention greatly improves upon the prior art by effectively doubling the air flow path through desiccant 30 while providing a simple and reliable construction. In one implementation, air to be dried enters desiccant 30 at inlet 32 and is communicated through the first flow path indicated by arrow 34, and is then redirected along second flow path 36 before exiting through outlet 38. As opposed to prior art systems which only provide for a single, linear path through a canister of relatively the same length, the present invention greatly extends the flowpath without increasing the outer footprint of the canister. The present invention therefore provides for greater drying capacity within the finite space limitations of the vehicle to which the canister will be mounted.

Figure 2:
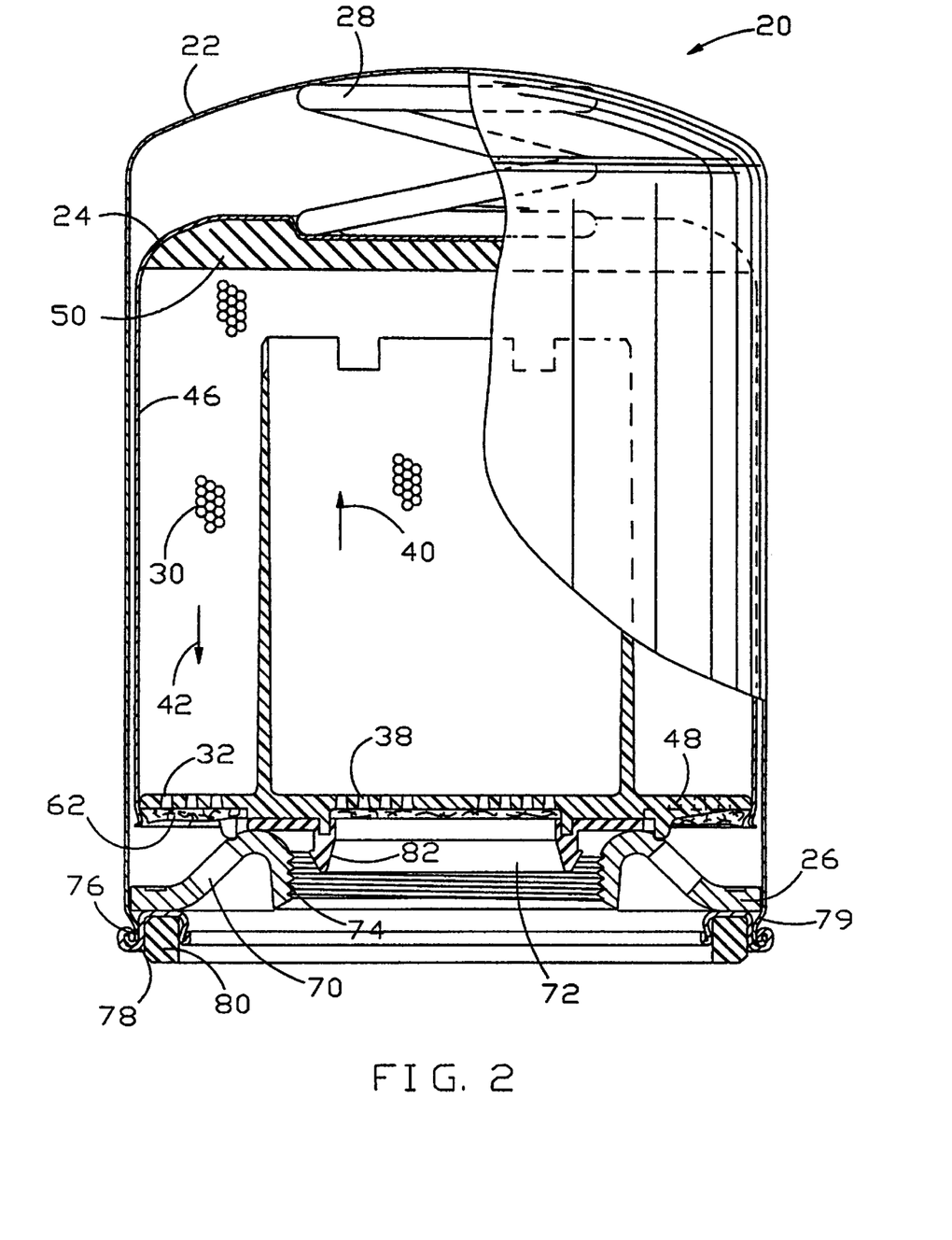
FIG. 2 is a partial sectional view of the filter of FIG. 1 showing the air flow paths during a purging cycle.
Figure 3:
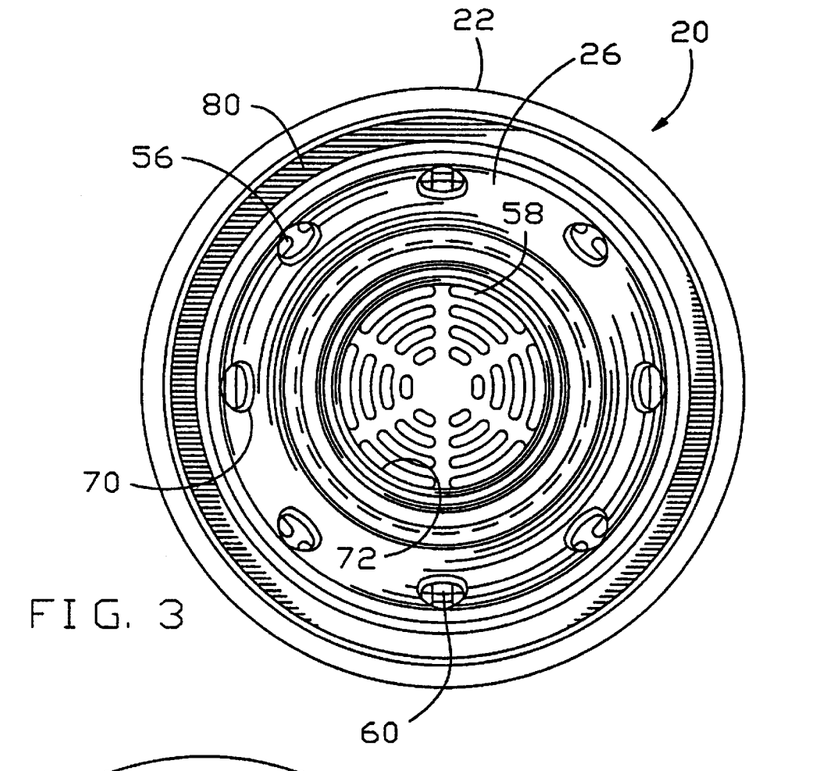
FIG. 3 is an end view of the filter.

Moreover, as shown in FIG. 2, the present invention is also able to employ a purge cycle to periodically remove the adsorbed water from the desiccant 30. In practice, this means air is communicated through outlet 38 in the direction indicated by arrow 40 to blow the adsorbed water from desiccant 30 and out through inlet 32 in the direction indicated by arrow 42. In addition to increasing the drying capacity of canister 20, the bi-directional, elongated flowpaths of the present invention also increase the working life of canister 20 by decreasing the amount of desiccant which is contaminated by oil passing through the desiccant.

Figure 4:
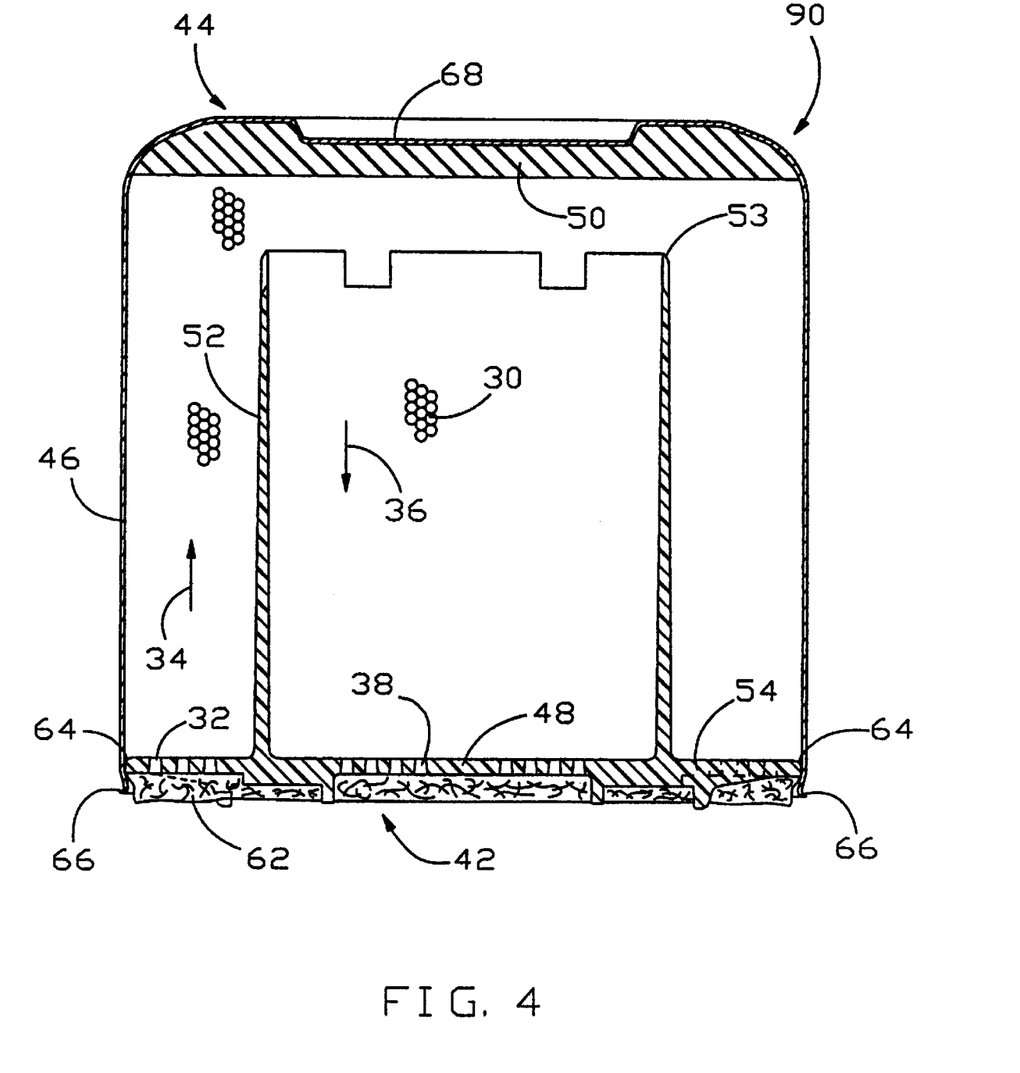
FIG. 4 is a sectional view of the inner shell containing the molecular sieve and showing the synthetic fabric barrier.

Returning now to the specific details of each element of the present embodiment of the invention, FIG. 4 shows inner shell 24 in cross-section. As shown therein inner shell 24 includes a closed end 44, an open end 42, and a cylindrical side wall 46. The shell can be readily formed by a conventional drawing operation. The chamber thereby created is filled with desiccant 30, and closed by baffle plate 48. In the preferred embodiment, and for purposes to be described below, an elastomeric pad 50 is provided proximate closed end 44.

The particular type of desiccant used in the preferred embodiment is a conventional bead-like substance such as aluminosilicate. In alternative embodiments, the specific type of desiccant used will vary, but will basically be a molecular sieve which is a material that has an affinity to collect certain types of molecules in the outer layers of its structure. In an oversimplification, a molecular sieve has many of the same properties as sand, it is inert chemically, and poses no environmental or health risks.

In accordance with the objective of increasing the flow path for the air to be dried without increasing the overall size of canister 20, desiccant 30 is divided into first flow path 34 and second flow path 36 by cylindrical tube 52. In the preferred embodiment, cylindrical tube 52 is integrally molded to disk 54. By manufacturing tube 52 such that its length is less than the length of inner shell 24, first flow path 34 is able to communicate with second flow path 36 proximate closed end 44.

To simply increase the length of the flow path will not necessarily increase the ability of the desiccant filter to dry the cycling air. If for example, the flow path is significantly lengthened, but the resulting diameter, area, or volume of the flowpath is diminished significantly, the overall drying capacity will suffer. It is therefore a feature of the present invention that the length to diameter ratio of the flowpaths be maintained between minimum and maximum ratios. Put another way, the preferred embodiment of the present invention includes at least twenty-five (25) percent of the total volume of the desiccant beads 30 within each of the first and second flow paths, 34 and 36, respectively. In this respect, the flow paths of the preferred embodiment include roughly equal dimensions.

Figure 5:
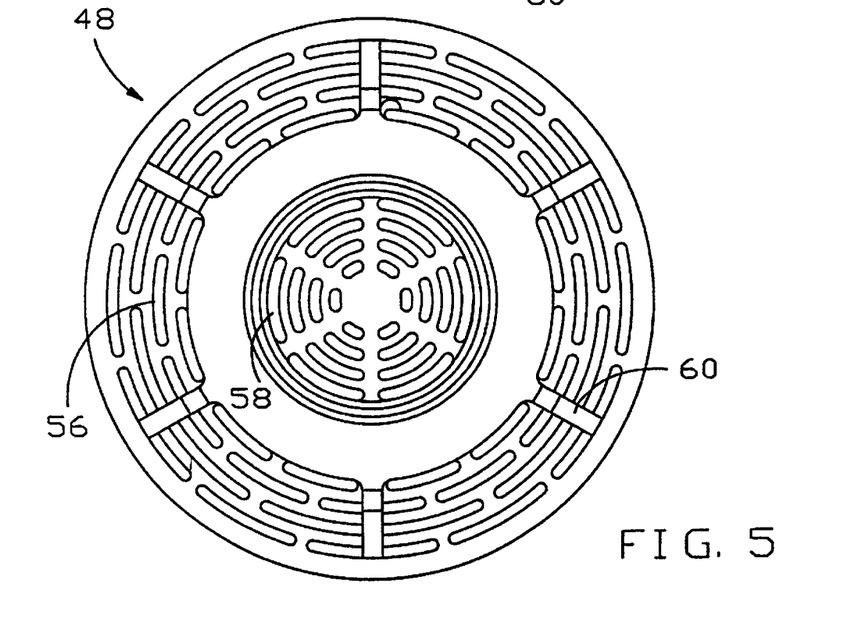
FIG. 5 is an end view of the inner shell shown in FIG. 4.

Turning now to FIG. 4, disk 54 is shown to be secured to open end 42 of inner shell 24 to capture desiccant 30 therein. As shown best in FIG. 5, disk 54 in the preferred embodiment is provided with a plurality of inlet apertures 56 disposed in an annular configuration about the outer circumference of disk 54, and a plurality of outlet apertures 58 disposed in a circular configuration in the center of disk 54. Alternatively, the inlet apertures can be provided about the center of disk 54, with the outlet apertures being provided about the periphery of the disk. Air to be dried enters inner shell 24 through inlet apertures 56 and then to first flow path 34. Similarly, dried air exits second flow path 36 through outlet apertures 58 for communication to the braking system (not shown). As is conventional, disk 54 includes a plurality of radially extending support ribs 60 to provide structural integrity to disk 54.

Since desiccant 30 is a molecular sieve (aluminosilicate having an 8–12 mesh bead size in the preferred embodiment), a means must be provided to capture desiccant within inner shell 24, while still enabling air to pass therethrough. To accomplish this, the present invention includes a synthetic fabric barrier 62 across inlet apertures 56 and outlet apertures 58. Synthetic fabric barrier 62 in the preferred embodiment is a form of nylon which includes orthogonally oriented fibers which allow air to pass therethrough, but which are sufficiently dense (1–2 micron in the preferred embodiment) to prevent passage of desiccant 30. If not for synthetic fabric barrier 62, the individual beads of desiccant 30, or a portion of beads, could escape inner shell 24 and migrate to the braking system to cause abrasion and premature failure of the brakes.

Another patentable feature regarding synthetic fabric 62 involves the manner in which it is associated with baffle plate 48. In the preferred embodiment, baffle plate is made of injection molded plastic. In order to secure fabric 62 across disk 54, fabric 62 is place into the mold used to make baffle plate prior to injection of melted plastic. When the hot plastic is injected into the mold, the hot plastic permeates the edges of fabric 62 such that when the plastic cools and hardens, the fabric is fastened to baffle plate without the need of any external fasteners. One advantage of this system is that by embedding fabric 62 directly into the plastic of disk 54, the fabric is reliably maintained in position during both the drying and purging cycles. If the fabric were simply fastened to one side of the disk, the bond between the disk and the fabric might be aided in one direction, but might tend to be pulled away from the disk when the air flow reverses direction. By embedding the fabric directly in the plastic this problem is avoided and a more reliable filter is created.

It is also important to note that disk 54 includes an annular edge 64 about its outer periphery which is in sliding contact with inner surface 65 of inner shell 46. After desiccant 30 is deposited within inner shell 24, baffle plate 48, complete with synthetic fabric 62, can be depressed into inner shell 24 until edge 64 is positioned proximate rim 66 of inner shell 24. Rim 66 is then crimped inward to retain baffle plate 48 within inner shell 24, but given the sliding contact between edge 64 and inner surface 65, baffle plate is provided with a limited degree of movement. The inner shell, baffle plate, and desiccant can therefore be pre-assembled as a complete package before insertion into outer shell 22 as will be discussed with further detail herein.

As stated above, one problem with prior art desiccants is that the desiccant can include areas of localized compression due to the cycling of the humid air and purge air. The areas of localized compression are accompanied by areas of loose compression which allow the individual beads to rub against each other. This abrasion can eventually lead to the formation of powder which can then be communicated to the braking system and cause brake wear and failure. Such a situation is even more problematic when the molecular sieve is divided by an internal baffle which limits movement of the sieve beads between flowpaths. To alleviate this problem, the present invention provides a system wherein spring 28 cooperates with slidable baffle plate 48 to provide uniform compression of the molecular sieve beads 30. The effect of spring 28 is most noticeable when a spring having a relatively high compression force is used. In the preferred embodiment, spring 28 exerts 150 lbs. of force. To further enhance such uniform distribution, one embodiment of the present invention includes elastomeric pad 50 which is positioned adjacent closed end 44, as will be discussed with further detail herein. Closed end 44 further includes recess 68 to partially receive spring 28.

To fully appreciate the manner in which the present invention avoids localized compression of desiccant 30, reference is again made to FIG. 1. As shown therein, spring 28 biases inner shell 24 toward baseplate 26. Inner shell is therefore basically suspended, or floating, within outer shell 22. Moreover, by placing baffle plate 48 in sliding, not fixed, contact with inner surface 65 of inner shell 24, baffle plate 48 is able to move in response to the compression of spring 28.

For example, if the desiccant 30 is uniformly distributed throughout inner shell 24, spring 28 will compress inner shell evenly and move baffle plate 48 relative to inner shell 24 uniformly across its planar axis. However, if one area of desiccant 30 does become more compacted than other areas, the force of spring 28 will cause baffle plate 48 to move relative to inner shell 24 in a non-uniform manner corresponding to the relative compaction of the desiccant beads 30 within inner shell 24. Put another way, spring 28 will cooperate with the sliding disposition of baffle plate 48 to move baffle plate 48 further into the inner shell in areas of lower compression than in areas of higher compression. In such a situation, disk 54 of baffle plate 48 will not be orthogonally disposed relative to the cylindrical wall 46 of inner shell 24 as shown in FIG. 1, but rather will be slightly skewed relative thereto.

In the preferred embodiment of the present invention, this effect is enhanced with the provision of elastomeric pad 50 adjacent closed end 44 of inner shell 24. The force of the compacted region pressing against pad 50 causes the elastomeric pad to deflect the force back and thus causes baffle plate 48 to move relative to inner shell 24. Since baffle plate 48 is not rigidly attached to inner shell 24, but rather is floating relative thereto and only held therein by rim 66, the baffle plate is able to move in response to the deflection of pad 50. The end result of this is that the areas of loose compression will become more compacted allowing the areas of high compression to loosen and thereby equalize the compression throughout the molecular sieve.

Another feature of the present invention outlined above is the provision of a desiccant canister with spin-on capability to facilitate relatively easy removal and replacement. This function is largely accomplished through baseplate 26 which has briefly been discussed above, but will now be described with particular reference to FIG. 2. Baseplate 26 in the preferred embodiment is a disk-like structure having a plurality of apertures 70 which communicate with apertures 56 of baffle plate 48, and a central aperture 72 in communication with apertures 58 of baffle plate 48. As shown in FIG. 1, outlet aperture 72 is provided with internal threads 74 which are adapted to attach to a threaded mount provided on a vehicle. In this respect, the present embodiment is therefore similar to convention spin-on oil or fuel filters which can be easily removed and replaced. Unlike the plastic construction of baffle plate 48, baseplate 26 is manufactured from metal, steel in the preferred embodiment.

It is important to note that baseplate 26 is not rigidly attached to outer shell 22, but rather is held within outer shell 22 by annular ring 76 which is crimped onto edge 79 of outer shell 22. Such a construction facilitates efficient assembly of canister 20 as will be discussed further herein. Annular ring 76 includes a groove 78 adapted to partially receive sealing gasket 80. As is conventional, gasket 80 will compress against the vehicle when canister 20 is secured thereto to provide an effective seal against contamination and pressure loss.

As shown in FIG. 1, a second gasket 82 is provided between baseplate 26 and baffle plate 48. Gasket 82 is provided to separate the air flowing into canister 20 from the dried air flowing out of canister 20, and conversely the purging air flowing into the canister from the purged air flowing out of the canister.

As a result of the aforementioned elements, the method by which the present invention is assembled is streamlined and adapted for pre-assembly of certain components. For example, as discussed above, synthetic fabric barrier 62 is injection molded into baffle plate 48, and after desiccant 30 is deposited in inner shell 24, baffle plate 48 is inserted into inner shell 24 until edge 64 passes rim 66 and is retained therein to form pre-assembled cartridge 90. Pre-assembled cartridges can therefore be assembled off-line, much as pleated paper filter elements are pre-formed before being assembled into spin-on oil filters. It is also important to note that cylindrical tube 52 includes beveled tips 53 to facilitate insertion of baffle plate 48 into desiccant 30.

Figure 6:
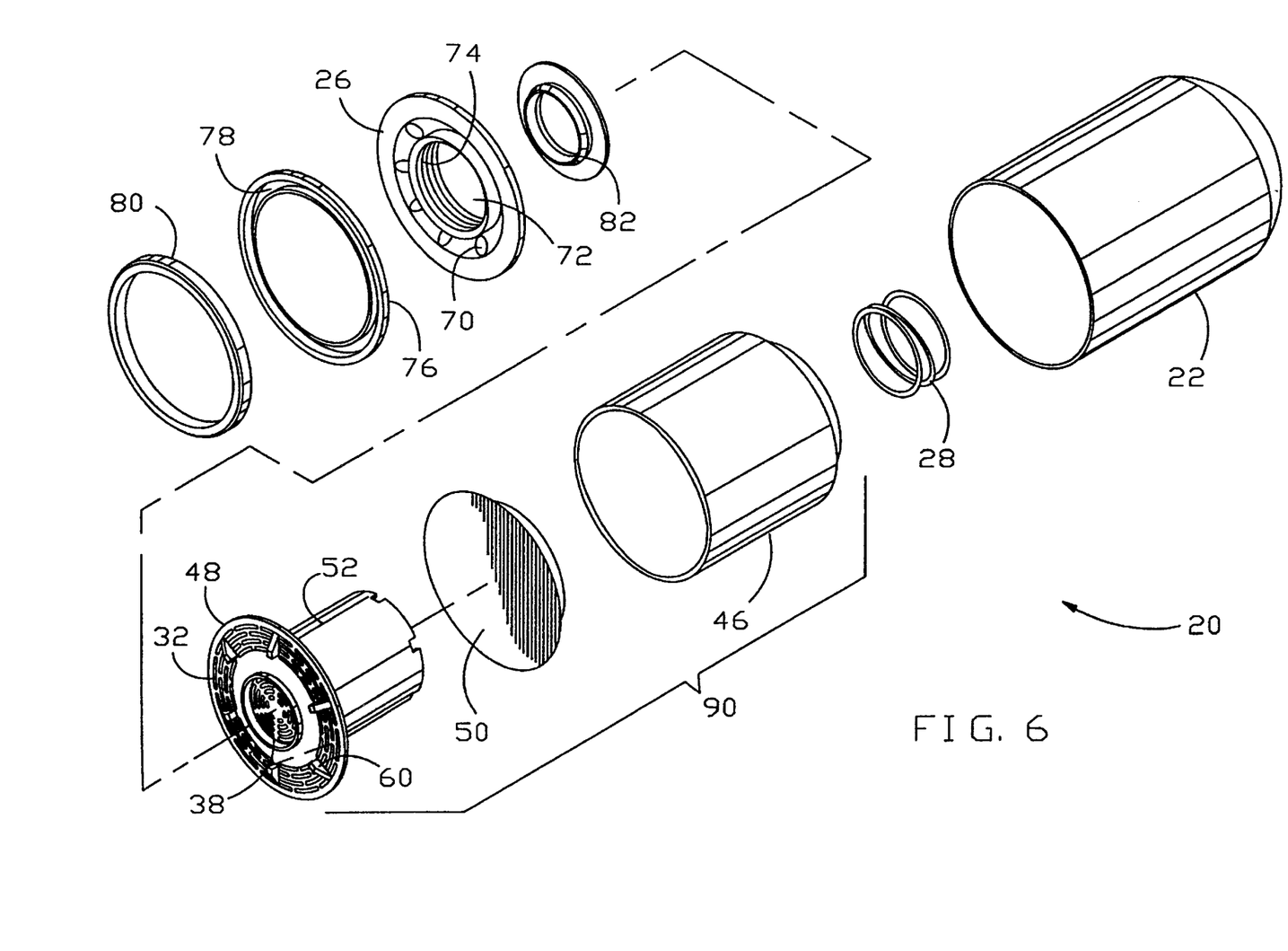
FIG. 6 is an exploded view of the filter of FIG. 1 showing the method of fabrication.

Referring now to FIG. 6, it can be seen that pre-assembled cartridge 90 can then be inserted into outer shell 22 to form completed canister 20. More specifically, gasket 82 is placed on top of baseplate 26, pre-assembled cartridge 90 is placed on top of gasket 82, spring 28 is placed on top of cartridge 90, and then outer shell 22 is placed down over cartridge 90 and baseplate 26. The force of this motion compresses spring 28 to the point where edge 79 of outer shell 22 comes into contact with baseplate 26. Annular ring 76 is then crimped or rolled into edge 79 by a conventional seaming operation. To complete canister 20, gasket 80 is fit within groove 78 of annular ring 76. Canister 20 is then in condition for threaded attachment to a vehicle employing an air braking system, and is capable of safely withstanding relatively high air pressure.

From the foregoing, it can be appreciated by one of ordinary skill in the art that the present invention brings to the art a new and useful desiccant canister for use with an air braking system. Through the use of a novel baffle plate design, the present invention greatly increases the length of the air flow path through the canister without increasing the overall outer size of the canister. Through the use of an internally threaded baseplate, the present invention can be threadably attached to a vehicle to allow for easy repair and replacement. Moreover, through the use of a floating inner shell and elastomeric pad, the compression of the molecular sieve within the inner shell is maintained in equilibrium to therefore avoid creation of desiccant powder which could contaminate the braking system. Furthermore, the method by which the present invention is assembled enables certain elements to be pre-assembled, and the entire canister to be quickly and efficiently fabricated.

What is claimed is:

1. A spin-on air desiccant filter for an air brake system, comprising:

an outer shell having an open end, a closed end and a cylindrical sidewall;

an inner shell disposed within the outer shell having an open end, a closed end, and a cylindrical side wall, a particulate desiccant substantially filling the inner shell;

a baffle plate having a disk and a cylinder integrally formed with and projecting from the disk, the baffle plate being slidably fit within the inner shell open end such that the cylinder divides the desiccant into two flow paths, an outer annular flow path and an inner cylindrical flow path, the two flow paths being of roughly equivalent size, the disk having formed therein apertures in communication with the inner flow path and apertures in communication with the outer flow path;

a baseplate connected to the outer shell open end and cooperating with a spring provided between the inner shell closed end and outer shell closed end to capture the inner shell therebetween in floating disposition, the spring moving the inner shell relative to the baffle plate in proportion to the relative compaction of the particulate desiccant, the baseplate having apertures in communication with the apertures of the baffle plate and an internally threaded inner aperture whereby the canister threadably attachs to the air braking system.

2. The air desiccant filter of claim 1 further including an elastomeric pad disposed proximate the closed end of the inner shell to distribute compression from the spring evenly across the desiccant.

3. The air desiccant filter of claim 1 wherein an annular seal is disposed between the baffle plate and baseplate to separate the inlets from the outlets.

4. The air desiccant filter of claim 1 wherein a synthetic fabric is provided over the baffle plate to allow passage of air, and prevent passage of the desiccant, therethrough.

5. The air desiccant filter of claim 4 wherein the synthetic fabric is embedded directly into the baffle plate during injection molding.

6. An air desiccant canister to be supported within an outer shell by spring pressure, the outer shell including a base, the base including internal threads for threaded attachment to an air braking system, the canister comprising:

a housing having an open end, closed end, and a side wall therebetween;

a desiccant medium substantially filling the housing;

an elastomeric pad disposed within the inner shell proximate the closed end to distribute the spring pressure evenly across the desiccant medium; and a baffle plate in sliding contact with the housing open end and dividing the desiccant such that a first air flow path and a coaxial second air flow path through the desiccant are established.

7. The air desiccant canister of claim 6, wherein the first flow path and coaxial second flow path are of roughly equivalent dimension.

8. The air desiccant canister of claim 7, wherein the housing side wall is cylindrical, and the baffle plate includes a disk and an integral cylinder, the inlet to the canister being provided through the disk on the inside of the canister, the outlet of the canister being provided through the baffle plate on the outside of the cylinder.

9. The air desiccant canister of claim 7 wherein the desiccant is a beaded molecular sieve.

10. The air desiccant canister of claim 7 wherein the housing is disposed within an outer shell having an open end, a closed end, and a cylindrical side wall, a spring being compressed between the housing closed end wall and the outer shell closed end by a baseplate connected to the outer shell open end, the base plate having an internally threaded inner aperture be threadably fastened to a vehicle braking system.

11. The air desiccant canister of claim 7 wherein a synthetic fabric is provided across the baffle plate to allow passage of air, and prevent passage of the desiccant therethrough.

12. The air desiccant canister of claim 11 wherein the synthetic fabric is embedded directly into the baffle plate during injection molding.

13. A method for fabricating an air desiccant canister, comprising the steps of:

inserting an elastomeric pad into an inner shell proximate a closed end of the inner shell;

depositing molecular desiccant within an inner shell having an open end, a closed end, and a cylindrical side wall;

slidably inserting a baffle plate having an end disk and a tube formed integrally with the disk into the inner shell open end, and thereby dividing the desiccant into first and second flowpaths of roughly equivalent dimension, the first flowpath being in communication with the second flow path;

placing the inner shell on top of a baseplate having an internally threaded inner aperture;

placing a spring on top of the closed end of the inner shell;

placing an outer shell over the spring and inner shell and compressing the spring until the outer shell open end contacts the base plate, the sliding engagement between the baffle plate and the inner shell cooperating with the spring to allow relative movement between the baffle plate and the inner shell to thereby maintain uniform compaction of the desiccant within the inner shell; and attaching the outer shell open end to the baseplate by seaming.

14. The method of claim 13 further including the step of inserting an elastomeric pad into the inner shell before depositing the molecular desiccant.

15. The method of claim 13 wherein the baffle plate is made of injection molded plastic, and further including the step of molding a synthetic fabric into the baffle plate to thereby contain the molecular desiccant within the inner shell.

16. The method of claim 13 further including the step of placing an annular seal between the base plate and the baffle plate.

17. The method of claim 13 further including the step of attaching an annular seal to the outer shell open end proximate the baseplate to provide a seal between the air desiccant canister and a machine to which the air desiccant canister is threadably attached.

18. The method of claim 13 wherein the attaching step is performed by seaming the outer shell to the baseplate.

19. The method of claim 13 wherein the inner shell, molecular desiccant, and baffle plate are pre-assembled prior to insertion into the outer shell.

* * * * *